3,689,373
Patented Sept. 5, 1972

3,689,373
PROCESS FOR SEPARATING HALOGENATED HYDROCARBONS BY GAS-LIQUID SEPARATION WITH A SOLVENT
William M. Hutchinson, Bartlesville, Okla., assignor to Phillips Petroleum Company
No Drawing. Filed May 10, 1971, Ser. No. 141,981
Int. Cl. C07c 17/38
U.S. Cl. 203—58   6 Claims

ABSTRACT OF THE DISCLOSURE

A process for separating 1,1,2-trichlorotrifluoroethane and 1,2-dichloro - 1,1 - difluoroethane and for separating 1,2-dichlorotetrafluoroethane and 1-chloro - 1,2,2 - trifluoroethane by adding an extraneous volatility-modifying agent and thereafter separating said compounds in the presence of said agent by a gas-liquid separation process.

This invention relates to the separation of halogenated hydrocarbons of a first mixture, more particularly, to a process for separating 1,2-dichlorotetrafluoroethane from a mixture of 1,2-dichlorotetrafluoroethane and 1-chloro-1,2,2 - trifluoroethane and separating 1,1,2 - trichlorotrifluoroethane from a mixture of 1,1,2-trichlorotrifluoroethane and 1,2-dichloro-1,1-difluoroethane.

In order to simplify the description of this process, 1,1,2 - trichlorotrifluoroethane is hereafter referred to as 113; 1,2-dichlorotetrafluoroethane is hereafter referred to as 114; 1,2-dichloro-1,1-difluoroethane is hereafter referred to as 132b; and 1-chloro-1,2,2-trifluoroethane is hereafter referred to as 133.

In various hydrocarbon processes known in the art, mixtures of 114 and 133 and mixtures of 113 and 132b are formed. It sometimes then becomes necessary to separate the halogenated hydrocarbons of the mixture for recovering the valuable constituents or for further processing. An example source of the 114–133 first mixture is found as a product of the electrochemical fluorination of ethylene dichloride and an example source of the 113–132b first mixture is also found as a product of the electrochemical fluorination of ethylene dichloride. The process of electrochemical fluorination of ethylene dichloride is known in the art and is not a part of this application and it should be understood that the halogenated hydrocarbon separation process of this invention can be utilized without regard to the process by which the halogenated hydrocarbon mixture was obtained.

In their separated form, the constituents of the first mixtures have boiling points at atmospheric pressure as follows:

| Mixture | Constituent | Boiling point, ° C. |
|---|---|---|
| 113–132b | 113 | 47.6 |
| | 132b | 46.8 |
| 114–133 | 114 | 3.6 |
| | 133 | 17.0 |

The relative volatility of the 113–132b mixture is only 1.01.

The relative volatility of the 114–133 mixture is slightly higher. Separation of these mixtures by ordinary distillation is therefor difficult. It is therefore advantageous to modify the relative volatility of the components by the addition of an extraneous agent. By this means one component becomes more or less volatile than the other component and separation is possible using a reasonable number of vapor-liquid contacting trays in a gas-liquid separation process. The actual separation process used may be extractive distillation, azeotropic distillation, or gas-liquid absorption depending on the system and the purity of products desired.

We have found that the 113–132b pair can be separated by a gas-liquid separation process in the presence of a volatility-modifying agent such as, for example, sulfolane or an N-alkylpyrrolidone, as shown by the following data.

EXAMPLE I

Separation of the 113–132b by simple distillation in the presence of sulfolane was demonstrated by blending 46.3 grams of 113–132b mixture (contained 59.3 wt. percent 132b, 39.1 wt. percent 113, and 1.6 wt. percent 123a $$(CHClF—CCl_2F_2)$$

with 177.6 grams of sulfolane and distilling the blend from a 500-ml. flask attached to a condenser. A simple distillation was then performed without reflux. The following data were taken:

TABLE I

| Overhead cut number | Temperature, ° C. | | Overhead distillate | | | |
| | Overhead | Kettle | Wt. g. | Composition,[1] wt. percent | | |
| | | | | 123a | 132b | 113 |
|---|---|---|---|---|---|---|
| 1 | 51 | 62–66 | 1.4 | Tr. | 29 | 71 |
| 2 | 51.5 | 66–73 | 5.4 | Tr. | 31 | 69 |
| 3 | 51.5 | 73–84 | 7.1 | 1 | 38 | 61 |
| 4 | 51.5 | 84–100 | 6.9 | 1 | 50 | 49 |
| 5 | 51.5 | 100–120 | 6.7 | 1 | 70 | 29 |
| 6 | 52.5 | 120–155 | 7.4 | Tr. | 89 | 11 |
| 7 | 53.0 | 155–200 | 4.8 | <0.5 | 99+ | <0.5 |
| 8 | Kettle residue, 181.9 g. | | | 0.00 | 0.9 | 0.04 |

[1] Analyses by gas-liquid chromatography.

The above data indicate that 113 is much more volatile in the presence of sulfolane than 132b and thus may be taken overhead in a gas-liquid separation process of extractive distillation or gas-liquid absorption type. Use of a longer column containing more stages should produce an overhead product approaching 100% 113 while obtaining (as shown by data in Table I) a bottoms product of 99+% 132b.

EXAMPLE II

It was similarly demonstrated that 113 could be separated from 132b by distillation in the presence of N-methyl-pyrrolidone (NMP). In this test, 55.6 grams of 113–132b mixture (same blend as in Example I) was added to 159.8 g. of NMP and distilled in the same column used in Example I. The following data were taken:

TABLE II

| Overhead Cut number | Temperature, ° C. | | Overhead distillate | | | |
| | Overhead | Kettle | Wt., g. | 123a | 132b | 113 |
|---|---|---|---|---|---|---|
| 1 | 58–60 | 90–99 | 14.0 | Tr. | 37.6 | 62.4 |
| 2 | 49.0 | 99–112 | 7.5 | 1.3 | 45.1 | 53.6 |
| 3 | 49.0–49.5 | 112–121 | 7.2 | 1.4 | 53.7 | 44.9 |
| 4 | 49.5–50.0 | 121–132 | 7.4 | 1.6 | 70.6 | 27.8 |
| 5 | 50.0–52.0 | 132–142 | 7.1 | 1.0 | 89.8 | 9.2 |

The above data indicate that 113 can be separated from 132b by distillation in the presence of NMP as a volatility-modifying agent although the separation was not as great as in the presence of sulfolane. More gas-liquid contacting stages are needed for NMP than for sulfolane.

It was demonstrated that 114 could be separated from 133 by a gas-liquid absorption process using as volatility-modifying agents acetone, benzonitrile, 3-methyl-sulfolane, and sulfolane. A ⅝-inch-diameter glass column with a height of 32 inches was packed with stainless steel packing to a height of 27 inches and used as the gas-liquid separation column. The solvent was passed to the top of the column and passed downward through the packing. The gaseous 114–133 mixture was passed upward through the column countercurrently to the descending solvent.

The gaseous effluent (raffinate) from the top and the solvent bottoms (extract) were analyzed by gas-liquid chromatography for 114, 133, and other halogenated hydrocarbons present in smaller amounts. The following data were obtained:

TABLE III

| Solvent | Solvent rate, ml./min. | Gas rate, liter/min. Feed | Gas rate, liter/min. Raffinate | Composition, wt percent Sample | 114 | 124a | 133 | 142a |
|---|---|---|---|---|---|---|---|---|
| | | | | Feed | 81.2 | 9.7 | 6.3 | 1.2 |
| Acetone | 0.74 | 0.108 | 0.049 | Raffinate | 99.3 | 0.7 | 0 | |
| | 0.70 | 0.108 | 0.072 | ----do---- | 99.0 | 1.0 | 0 | |
| | 0.40 | 0.108 | 0.072 | ----do---- | 96.0 | 3.8 | 0.2 | |
| | | | | Extract [1] | 58.7 | 18.2 | 13.9 | 1.3 |
| Benzonitrile | 1.23 | 0.123 | 0.078 | Raffinate | 88.3 | 8.2 | 3.5 | 0 |
| | 1.23 | 0.123 | 0.076 | ----do---- | 92.8 | 7.2 | 0.01 | 0 |
| | | | | Extract [1] | 52.8 | 10.7 | 15.5 | 1.7 |
| 3-methylsulfolane | 2.99 | 0.107 | 0.061 | Raffinate | 98.3 | 1.7 | 0 | 0 |
| | 1.24 | 0.107 | 0.070 | ----do---- | 96.6 | 3.4 | 0.01 | 0 |
| | | | | Extract [1] | 38.5 | 18.6 | 24.3 | 2.3 |
| Sulfolane | 2.9 | 0.112 | 0.072 | Raffinate | 96.8 | 3.2 | 0.05 | 0 |
| | 1.7 | 0.112 | 0.082 | ----do---- | 95.0 | 4.5 | 0.05 | 0 |
| | | | | Extract [2] | 20.1 | 11.9 | 20.5 | 5.8 |

[1] Solvent-free basis.
[2] Includes solvent.

NOTE.—124a=$CHF_2CClF_2$; 142a=$CHCl_2CH_2F$.

The above data indicate that a significant separation was made between 114 and 133 by gas-liquid absorption using the 4 solvents listed. Additional separation would be obtained by use of longer columns containing additional separation stages. The gas-liquid absorption column is easily converted to an extractive distillation column by adding a reboiler to the base of the column and thus generating stripping vapor for that section of the column below the point of gaseous feed entry. Thus the data demonstrate that 114 and 133 can be separated by either gas-liquid absorption or by extractive distillation using as extraneous agents sulfolane, acetone, benzonitrile, and 3-methylsulfolane.

Other modifications and alterations of this invention will become apparent to those skilled in the art from the foregoing discussion and examples, and it should be understood that this invention is not to be unduly limited thereto.

What is claimed is:

1. A process for separating 1,1,2 - trichlorotrifluoroethane from a first mixture of 1,1,2-trichlorotrifluoroethane and 1,2-dichloro-1,1-difluoroethane, comprising:
   adding a solvent selected from one of acetone, benzonitrile, sulfolane, 3-methylsulfolane, or mixtures thereof for forming a resultant second mixture; and separating 1,1,2-trichlorotrifluoroethane from the 1,2-dichloro-1,1-difluoroethane of said second mixture by a gas-liquid contacting process.

2. A process, as set forth in claim 1, wherein the gas-liquid contacting process is an extractive distillation process.

3. A process, as set forth in claim 2, wherein the solvent is sulfolane.

4. A process for separating 1,2-dichlorotetrafluoroethane from a first mixture of 1,2 - dichlorotetrafluoroethane and 1-chloro-1,2,2-trifluoroethane, comprising:
   adding a solvent selected from one of acetone, benzonitrile, sulfolane, 3-methylsulfolane, or mixtures thereof for forming a resultant second mixture; and separating 1,2-dichlorotetrafluoroethane from the 1-chloro-1,2,2-trifluoroethane of said second mixture by a gas-liquid contacting process.

5. A process, as set forth in claim 4, wherein the gas-liquid contacting process is an extractive distillation process.

6. A process, as set forth in claim 5, wherein the solvent is sulfolane.

References Cited

UNITED STATES PATENTS

| 3,236,030 | 2/1966 | Von Tress | 55—71 |
| 3,282,801 | 11/1966 | Wust | 203—62 |
| 3,406,099 | 10/1968 | Buckman et al. | 203—62 |
| 3,391,201 | 7/1968 | Jaeger | 203—58 |
| 3,488,920 | 1/1970 | Hutchinson | 55—71 |
| 3,624,166 | 11/1971 | Fuhrmann | 260—653 |

WILBUR L. BASCOMB, JR., Primary Examiner

U.S. Cl. X.R.

203—60, 62; 260—653 R